(12) United States Patent
Ford

(10) Patent No.: US 8,844,835 B2
(45) Date of Patent: Sep. 30, 2014

(54) METHOD AND SYSTEM FOR RELIABLY DETECTING STRUCTURE AND WATER SYSTEM LEAKS

(76) Inventor: Michael Brent Ford, St George, UT (US)

( * ) Notice: Subject to any disclaimer, the term of this patent is extended or adjusted under 35 U.S.C. 154(b) by 2176 days.

(21) Appl. No.: 11/734,714

(22) Filed: Apr. 12, 2007

(65) Prior Publication Data

US 2008/0252471 A1 Oct. 16, 2008

(51) Int. Cl.
*G05D 22/02* (2006.01)
*G08B 21/20* (2006.01)

(52) U.S. Cl.
CPC .................................... *G08B 21/20* (2013.01)
USPC ................. 236/44 A; 236/44 C; 340/605

(58) Field of Classification Search
USPC ............................................ 236/44 A, 44 C
See application file for complete search history.

(56) References Cited

U.S. PATENT DOCUMENTS

| | | | |
|---|---|---|---|
| 4,553,432 A | 11/1985 | Barlian et al. | |
| 4,730,637 A | 3/1988 | White | |
| 5,038,820 A | 8/1991 | Ames et al. | |
| 5,347,264 A | 9/1994 | Bjorkman | |
| 6,765,896 B1 | 4/2002 | Ford | |
| 6,414,601 B1 | 7/2002 | Massedonio | |
| 6,612,323 B1* | 9/2003 | Horne | 137/1 |
| 6,691,724 B2 | 2/2004 | Ford | |
| 6,792,799 B2 | 9/2004 | Ford | |
| 6,832,625 B2 | 12/2004 | Ford | |
| 6,892,746 B2 | 5/2005 | Ford | |
| 2002/0023481 A1 | 2/2002 | Wagner | |
| 2004/0134545 A1* | 7/2004 | Ford | 137/624.11 |
| 2004/0257656 A1* | 12/2004 | Sellgren et al. | 359/512 |
| 2005/0195078 A1 | 9/2005 | Basinger et al. | |
| 2006/0007008 A1 | 1/2006 | Kates | |
| 2006/0059977 A1 | 3/2006 | Kates | |
| 2006/0195569 A1* | 8/2006 | Barker | 709/224 |
| 2006/0273896 A1* | 12/2006 | Kates | 340/539.18 |
| 2008/0217419 A1* | 9/2008 | Ehlers et al. | 236/44 C |

OTHER PUBLICATIONS

Office Action in U.S. Appl. No. 11/734,714 mailed Dec. 8, 2009.

* cited by examiner

*Primary Examiner* — Jonathan Bradford
(74) *Attorney, Agent, or Firm* — Mitch Harris, Atty at Law, LLC; Andrew M. Harris

(57) ABSTRACT

A method and system for reliably detecting structure and water system leaks incorporates motion-sensing for determining whether there is activity in a building is occupied and measures humidity of the inside of the building. If there is no activity in the building, and an unexpected level of humidity or sudden change in humidity is detected, an alarm is generated and the building water system can be disabled by an electrically controlled valve. Current consumed by water-consuming and/or water vapor generating appliances can be detected and used to qualify the generating of an alarm or interruption of the water system, so that false alarms are not generated and the water supply is not interrupted due to operation of those appliances.

16 Claims, 4 Drawing Sheets

METHOD AND SYSTEM FOR RELIABLY DETECTING STRUCTURE AND WATER SYSTEM LEAKS

CROSS-REFERENCE TO RELATED APPLICATIONS

The present U.S. Patent Application is related to co-pending U.S. patent application 11/734,723 entitled "METHOD AND SYSTEM FOR DETECTING WATER SYSTEM LEAKS", filed on Apr. 12, 2007. The above-referenced U.S. Patent Application is incorporated herein by reference.

BACKGROUND OF THE INVENTION

1. Field of the Invention

The present invention relates generally to building protection systems, and more specifically, to a system for generating a preventative response to a detection of potential water leakage conditions.

2. Background of the Invention

Prevention of loss due to water damage in both residential and commercial locations has long been a concern and have been addressed in various manners in the past, the simplest of which are sump pumps or floor water presence detector. More recently, mold damage and other damage due to humidity has become a concern, in part, because health risks due to the presence of airborne "black mold" spores and damage and health risks cause by other fungi are better appreciated.

Maintaining an acceptable level of average humidity can be accomplished with dehumidifiers or by the action of heating and air conditioning (HVAC) equipment. However, an excess amount of humidity can indicate the presence of standing water or a roof leak that should be corrected or mold growth and other damage to building materials may quickly result. Water system leaks can also contribute to an excessive amount of humidity or standing water. A rapid response to prevent damage from such leaks is the subject of U.S. Pat. No. 6,691,724 entitled "METHOD AND SYSTEM FOR CONTROLLING A HOUSEHOLD WATER SUPPLY", issued to the present inventor and which is incorporated herein by reference, which discloses a system alarm that can be enabled when a house is unoccupied and shuts off the water supply when flow is detected. Further improvements so that the system can remain continuously active and determine whether a house is occupied are disclosed in U.S. Pat. No. 6,892,746 entitled "METHOD AND SYSTEM FOR CONTROLLING A HOUSEHOLD WATER SUPPLY INCORPORATING MOTION-SENSING FOR DETERMINING WHETHER A HOUSE IS OCCUPIED", also issued to the present inventor and which is incorporated herein by reference.

However, the systems above-incorporated U.S. patent applications generally address prevention of water or humidity damage to the degree that the water or humidity is due to a water distribution system leak, and thus does not prevent damage due to structure leaks such as roof, wall or foundation leaks. Further, the detection of leaks is made based upon a measurement of water flow, and it is possible that a very low level of water flow from a plumbing system leak can still cause damage, such as by promoting mold growth. Finally, the systems described in the above-incorporated U.S. patent applications generally prevent the use of appliances that cause water flow when a building is unoccupied and such appliances may actually be damaged or rendered inefficient by having an interrupted water supply. For example, an automatic icemaker in a refrigerator will intermittently cause a flow sufficient to be of concern, but it is desirable that an icemaker have a water supply while operating. Appliances such as washing machines generally will have their operation interrupted by cutting off water flow to the household water supply, presenting an inconvenience.

Conditions promoting mold growth can often be detected by measuring the humidity internal to the building. However, there are times when a high level of humidity in certain areas of a residential or commercial building are normal, such as when a person is bathing or releases water vapor into the rest of a house by opening a bathroom door. Similarly, kitchen areas when in use may produce a large amount of steam under normal use.

Therefore it would be desirable to provide a method and system for detection of both water system leaks and structure leaks without causing false alarms under normal building use conditions, detection of low-flow leaks that might be missed by a flow detection system, and prevention of inconvenience, false alarms, or appliance damage due to water system interruption, when a water-flow causing appliance is left operating when a building is unoccupied.

SUMMARY OF THE INVENTION

The above objective of detecting both water system leaks and structure leaks without causing false alarms under normal household use conditions is accomplished in a method and system for detecting excessive humidity conditions when no human activity is present in a building. The system includes a humidity detector and a motion sensor and a control system for generating an alarm indication when the humidity rises above expected levels while the building is unoccupied or is otherwise inactive, such as when household occupants are asleep. The motion sensor detects motion in the building in general, in order to determine whether or not there is human activity in the building.

The system may further include a electrically-controlled valve that controls water flow in response to an indication from the control system, so that the valve is closed when there is no activity in the building, and which may be further be qualified by detection of a decrease in pressure in the water distribution system when the valve is closed, or by a measurement of water flow if the valve is left open.

Appliance current may be sensed and used to qualify the alarm and/or provide temporary override operation of the building water supply when known water-using appliances are activated. Humidity measurements may be further qualified by determining whether water vapor producing appliances are active.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention concerns techniques for protecting a building from damage due to structure or water system leaks. Humidity levels are monitored as an indication of the possible presence of leaks, and false alarms are qualified by using one or more motion sensors to determine whether human activity is present in the building, which prevents the generation of false alarms due to normal activity that generates water vapor, such as bathing or cooking in a residential building. The water system may be controlled by an electrically controlled valve, which is shut off in response to a humidity indication that exceeds a threshold while the motion sensors indicate that the building is vacant or there is no human activity, for example when household occupants are sleeping.

Figure 1:
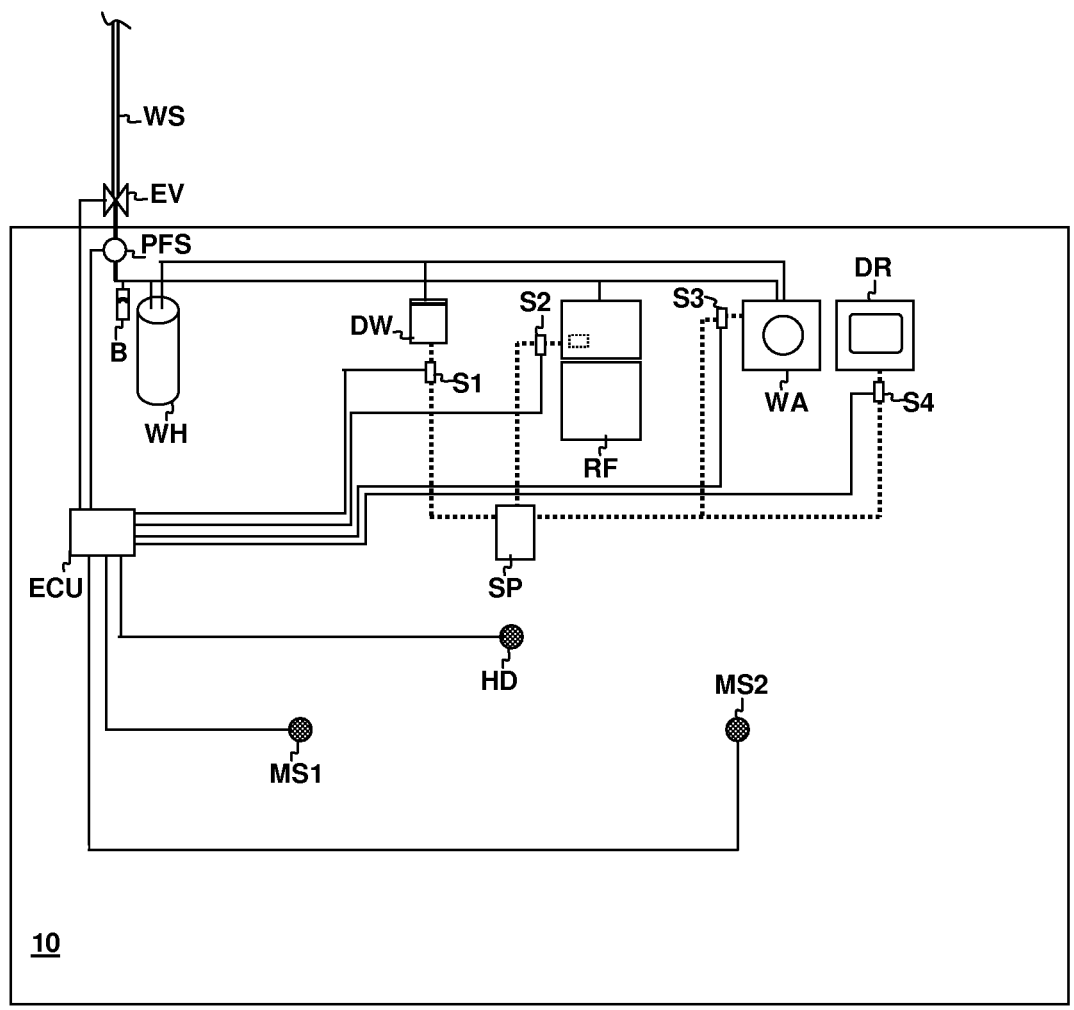
FIG. 1 is a schematic diagram depicting a household water supply coupled to a system in accordance with an embodiment of the present invention.

Referring now to FIG. 1, a residential building 10, is shown that incorporates a system in accordance with an embodiment of the present invention. Building 10, is connected to a water supply WS by an electrically controllable valve EV. Electrically controllable valve EV receives a control signal from electronic control unit ECU, which pulses the valve solenoid to turn electrically controllable valve EV on and off. A set of motion sensors MS1,MS2 and a humidity detector HD are connected to electronic control unit ECU, which may be a general building control and alarm system that includes improvements in accordance with embodiments of the present invention, a stand-alone unit, or electronic control unit ECU may be interfaced to a commercially available building control and alarm system.

The water supply output of electrically controllable valve EV provides a cold water supply branch that is connected to a water heater WH, an icemaker within a refrigerator RF, and a clothes washer WA, along with other appliances and fixtures. A hot water supply branch provided by water heater WH is connected to a dishwasher DW and clothes washer WA. Pressure on both branches may be stabilized with a bladder B, which may be a balloon or diaphragm system with a closed air chamber and a flexible air/water boundary, so that changes of pressure with flow are reduced in slope/rate. Each of dishwasher DW, ice maker within refrigerator RF, clothes washer WA and a clothes dryer DR are connected to appliance current sensors S1-S4, which sense activation current of the corresponding appliance that is drawn from an AC service panel SP. Current sensors S1-S4 serve one or more of several functions. Certain appliances, such as clothes washer WA, the ice maker within refrigerator RF and dishwasher DW use water during their operation. Therefore it is desirable to provide for temporary override of the shutoff of the household water supply by electrically controllable valve EV when any of the water using appliances is in operation. Further, when the system does provide temporary override of the water supply shutoff, it is desirable to open the water supply only when the appliances are active. Therefore, the opening of electrically controllable valve EV may be conditioned upon sensing appliance current via current sensors S1-S4 and the activation of an appliance override mode. Further, current sensors S1-S4 may also include an electronically controlled switch that can disable the power supply to the corresponding appliances if the appliances continue to demand current past a predetermined period of time, or a time that is learned by the system for that particular appliance.

Appliances such as clothes dryer DR and dishwasher DW may generate water vapor within building 10 while they are in use, and therefore it may be desirable to override any excess humidity alarm while they are operating or take into account such operation when determining if the humidity is excessive. Other appliances may be sensed for operation, such as stoves, which may also indicate a possible humidity overage in the kitchen area. Therefore current sensors S1-S4 may also be used to qualify the humidity alarm and the control of electrically controllable valve EV when humidity detector HV would otherwise indicate a humidity condition that should generate a alarm and/or turn off the building water supply.

A pressure sensor PS is coupled to the water supply line on the building 10 side of the water supply, after electrically controllable valve EV. If a flow sensor is also employed, the flow sensor may alternatively be located on either side of electrically controllable valve EV. Pressure sensor PS sends a pressure level signal to electronic control unit ECU that indicates the severity of a leak when electrically controllable valve EV is closed. The rate of pressure drop as sensed by pressure sensor PS indicates whether a leak may be due to a dripping faucet or other expected type of flow, versus that due to a water system blowout or other more severe leak. By comparing the back-pressure present in the building 10 the side of water system to a lower flow threshold and a higher flow threshold, an indication can be generated as a warning upon detection of low flow, while an alarm may be generated for high flow conditions and the electrically controllable valve EV, prevented from opening when activation is attempted, such as when motion sensors MS1,MS2 indicate activity is present or an appliance override is active and current sensors S1, S2 or S3 indicate that a water-consuming appliance has been activated.

Figure 2:
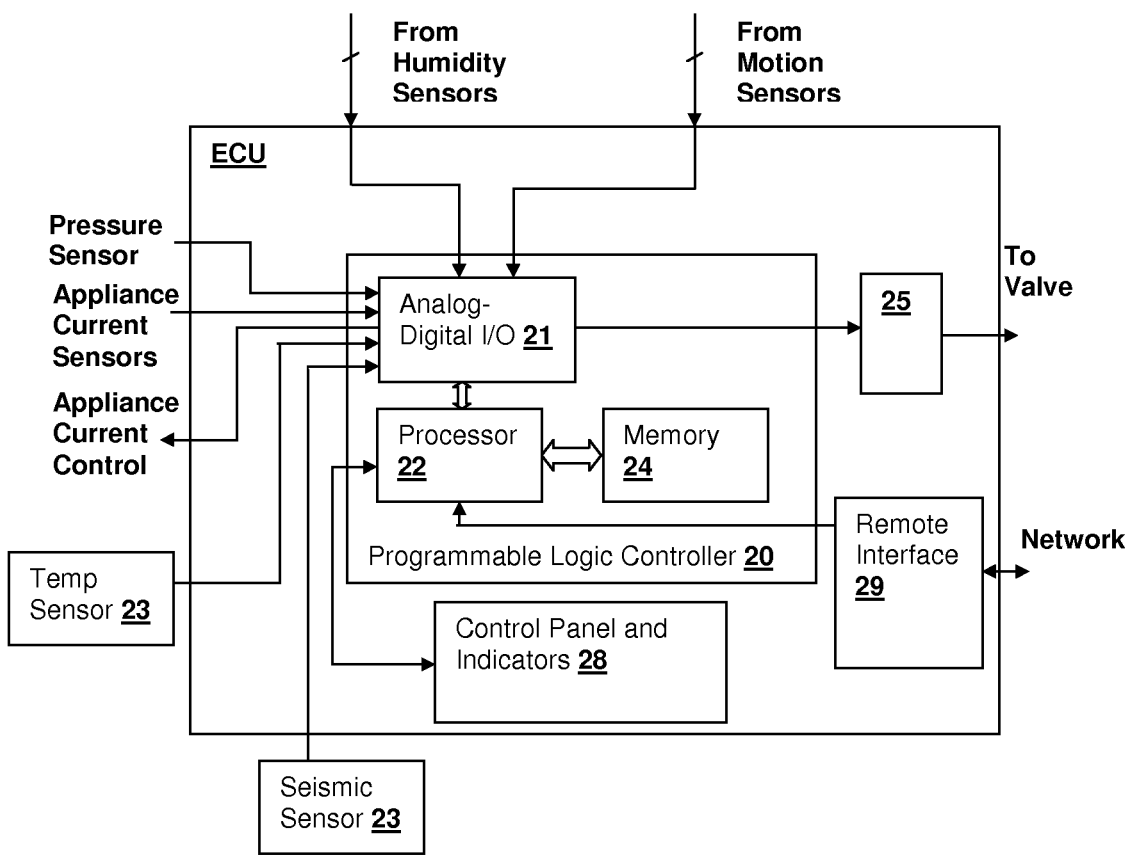
FIG. 2 is a block diagram depicting details of a system control unit in accordance with an embodiment of the present invention.

Referring now to FIG. 2, details of electronic control unit ECU are shown. Various sensor signals, such as appliance current sense inputs from appliance current sensors S1-S4 and an input from pressure sensor PS, are received by an analog and digital I/O circuit 21 that is interfaced to a processor 22 and memory 24 that form a programmable logic controller (PLC) 20. As described above, analog and digital I/O circuit 21 may also provide control signals to control appliance power supplies if appliance current sensors S1-S4 include an electronically controlled switch. Program instructions in memory 24, generally provided from a read-only memory (ROM) are executed by processor 22 to carry out the steps of methods in accordance with embodiments of the present invention.

Inputs from a temperature sensor 23 and seismic sensor 27 further inform PLC 20 whether the water supply should be shut off and an alarm sounded, and the temperature sensor input may be further used to adjust humidity profiles to determine whether or not the humidity level within building 10 is excessive. PLC 20 is further coupled by analog digital I/O circuit 21 to a power control circuit 25, such as a solid-state relay, that controls electrically controllable valve EV, and to a remote interface 29 such as an Ethernet connection, which can provide alarm indications and remote control via a satellite, digital subscriber link (DSL) or cable modem interface. Alternatively, remote interface 29 may be implemented as a standard telephone modem, ISDN connection, proprietary link or other suitable interface to provide remote control and status indications.

PLC 20 is also connected to controls and indicators on a panel of ECU or a wirelessly connected remote local panel 28 that provides control of the system and alarms to occupants of the building 10. The alarm function may also be provided by connection to an input of an ordinary household alarm system, and the alarm may be a horn located remotely and driven by either electronic control unit ECU or another alarm system.

Figure 3:
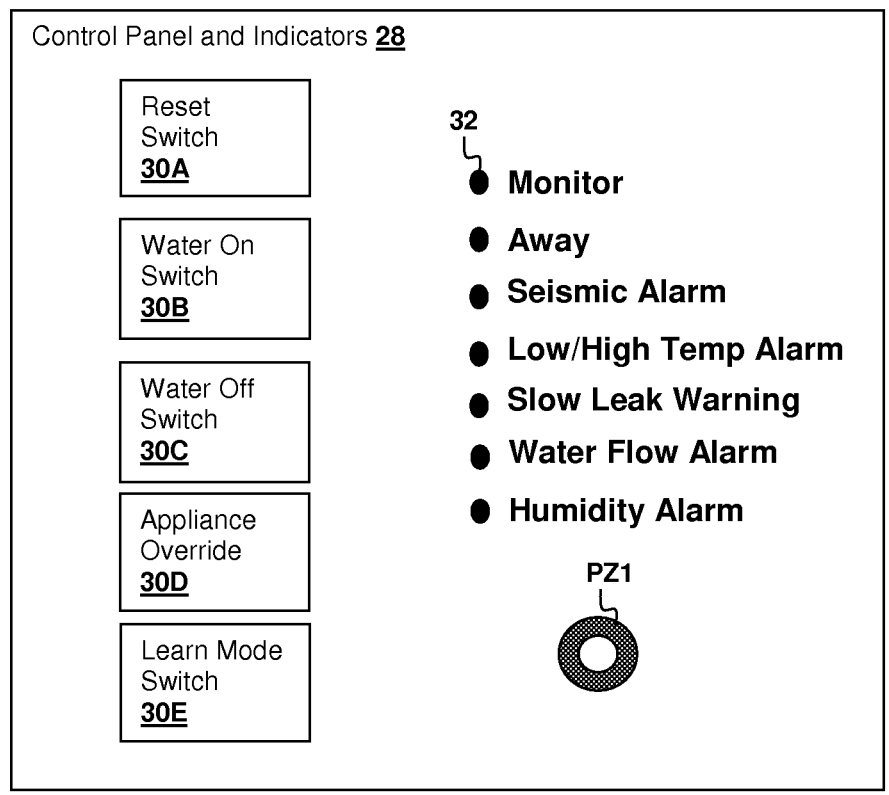
FIG. 3 is a pictorial diagram depicting a front panel of a system control unit in accordance with an embodiment of the present invention.

Referring now to FIG. 3, an exemplary set of controls and indicators is shown as may be implemented in control panel and indicators 28. In the illustrative example, control panel and indicators 28 includes membrane switches as follows: a reset switch 30A for resetting the system; a water on switch 30B for completely overriding any water shut-off condition; a water off switch 30C for manually turning off electrically controllable valve EV, such as when the occupants are leaving for an extended time; an appliance override switch 30D, and a learn mode switch 30E. Learn mode switch 30E sets a mode in which water flow and humidity levels are observed by PLC 20, so that normal household use levels of humidity and water flow patterns can be determined and used to set thresholds and profiles for detecting of abnormal conditions, when the system is in use. In learn mode, the system may also be trained to observe particular current consumption profiles of appliances, so that electrically controllable valve EV can be properly controlled to supply water to water-consuming appliances when the appliance override mode is set.

In the illustrative example, control panel and indicators 28 includes LED indicators 32 as follows: a monitor indicator, which indicates the monitoring system is active; an away indicator, which indicates the water system is shut off; a seismic alarm indicator, which indicates that seismic sensor 27 has been triggered; a low/high temperature alarm indicator, which indicates that temperature sensor 23 has detected extreme heat or a near-freezing condition; a slow leak alarm, which indicates that the back-pressure pressure drop rate is between the low and high level thresholds; a water flow alarm, which indicated that the rate of pressure drop has exceeded the upper threshold; and a humidity alarm that indicates that the humidity has exceeded a threshold when building 10 is unoccupied, or that a profile has been exceeded when the household is in use. The profiles may be selected or adjusted in conformity with a time of year and/or measured temperature. For example, PLC 20 may have a real-time clock that keeps track of the day of year and the time of day and the humidity threshold value that is used to determine whether an excessive humidity condition exists is adjusted based on the time of day, the ambient temperature and the time of year, in order to decide an abnormal humidity condition. A piezoelectric transducer PZ1 is also included on the panel to provide an audible local alarm. All of the above indicators and controls, as well as other system controls may be provided remotely via remote interface 29.

Figure 4:
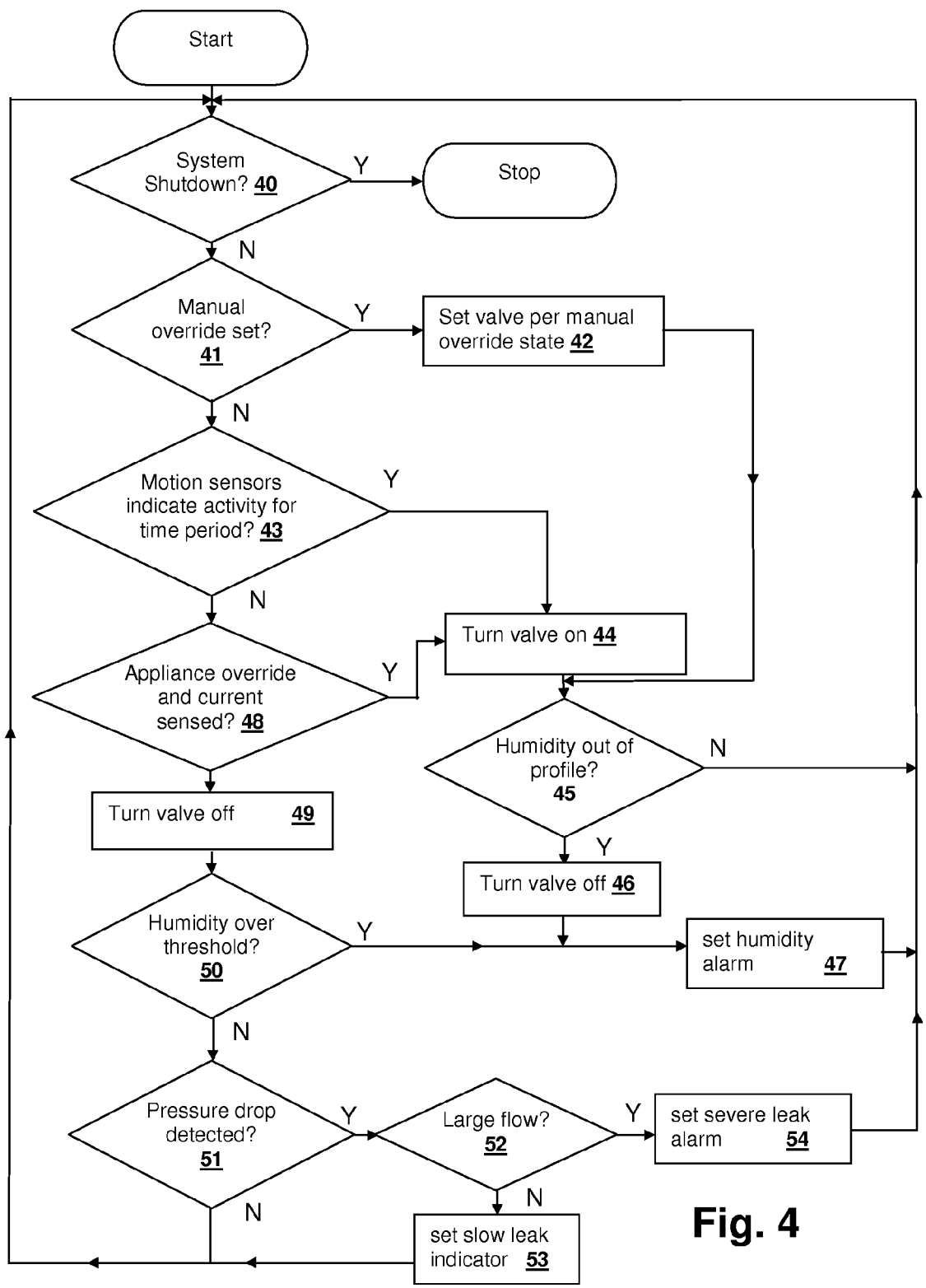
FIG. 4 is a flowchart depicting operation of a system in accordance with an embodiment of the present invention.

Referring now to FIG. 4, a method of operation of the above-described system is provided in a flowchart. Until the system is shut down (decision 40), the control loop from steps 41 through 52 is executed. If a manual override is set (decision 41), then a full override state is set and water will be continuously supplied (step 42). Otherwise, if motion sensor(s) MS1, MS2 indicate that human activity has occurred in building 10 during the timeout period (decision 43), then electrically controllable valve EV is turned on (step 44) and the humidity is observed to determine if it exceeds the learned (or predetermined) profiles (decision 45). If any indicators were previously set, they will not be reset upon detection of motion so that occupants are alerted to a previous leak condition. If a humidity profile is exceeded (decision 45), then electrically controllable valve EV is turned off (step 46) and the humidity alarm is set (step 47).

When motion sensor(s) MS1,MS2 indicate that no human activity has occurred in building 10 for a predetermined time period (decision 43), if an appliance override mode is set and current sensors S1-S3 indicate that a water-consuming appliance is operating (decision 48), then electrically controllable valve EV is turned on (step 44). Otherwise, electrically controllable valve EV is turned off (step 49). If the detected humidity is over a threshold (decision 50) then the humidity alarm is set (step 50). Otherwise, if a pressure drop is detected (decision 51), but the drop indicates a low flow condition such as a faucet drip, then the slow leak indicator is set (step 53). If a large flow condition is detected (decision 52), then the severe leak alarm is set (step 54).

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A system for detecting potentially destructive water leakage conditions in a building, comprising: a humidity detector for detecting a level of humidity inside of said building; a control circuit having an input coupled to said humidity detector and generating a preventative response in conformity with determining that said level of humidity has exceeded a threshold; at least one motion sensor coupled to said control circuit for providing an indication of human activity within said building, wherein said control circuit ignores said determination that said level of humidity has exceeded a threshold and does not generate the preventative response when said motion sensor indicates that human activity is occurring; an electrically controllable valve for disabling at least a portion of a water supply of said building, wherein said control circuit is coupled to said electrically controllable valve to control said electrically controllable valve, and wherein said preventative response includes closing said electrically controllable valve; and an appliance current sensor for sensing activation of at least one appliance that uses said portion of said water supply, wherein said current sensor is coupled to said control circuit, and wherein said control circuit opens said electrically controllable valve if said at least one appliance is activated.

2. The system of claim 1, wherein said preventative response is an alarm signal.

3. The system of claim 1, further comprising a temperature sensor having an output coupled to said control circuit, and wherein said control circuit adjusts said threshold in conformity with said output of said temperature sensor.

4. The system of claim 1, wherein said control circuit includes a timing circuit for indicating at least a calendar position within a current year, and wherein said control circuit adjusts said threshold in conformity with said calendar position.

5. The system of claim 1, wherein said control circuit has a learning mode in which at least one normal humidity profile is measured, wherein said control circuit stores profile information determined during said learning mode, and wherein said control circuit qualifies said determination of whether or not said level of humidity has exceeded said threshold in further conformity with said stored profile information.

6. A system for detecting potentially destructive water leakage conditions in a building, comprising: a humidity detector for detecting a level of humidity inside of said building; a control circuit having an input coupled to said humidity detector and generating a preventative response in conformity with determining that said level of humidity has exceeded a threshold; at least one motion sensor coupled to said control circuit for providing an indication of human activity within said building, wherein said control circuit ignores said determination that said level of humidity has exceeded a threshold and does not generate the preventative response when said motion sensor indicates that human activity is occurring; and an appliance current sensor for sensing activation of at least one appliance that generates water vapor when in use, wherein said current sensor is coupled to said control circuit, and wherein said control circuit only generates said preventative response if said humidity exceeds said threshold when said at least one appliance is not activated.

7. A method for detecting potentially destructive water leakage conditions in a building, comprising: detecting a level of humidity inside of said building; sensing motion indicating human activity within said building; generating a preventative response in conformity with a result of said detecting and said sensing such that said preventative response is generated only when said detected level of humidity is greater than a threshold level and the sensing does not sense motion indicating human activity within the building; disabling at least a portion of a water supply of said building by closing an electrically controllable valve as said preventative response; and sensing activation of at least one appliance that uses said portion of said water supply by measuring an electrical current consumed by said at least one appliance, and wherein said disabling said at least a portion of said water supply is only performed during an appliance override condition while said sensing does not sense that said at least one appliance is active.

8. The method of claim 7, wherein generating generates an alarm signal.

9. The method of claim 7, further comprising:
sensing a temperature within said building; and
adjusting said threshold in conformity with said output of said temperature sensor.

10. The method of claim 7, further comprising:
retrieving an indication of a calendar position within a current year; and
adjusting said threshold in conformity with said calendar position.

11. The method of claim 7, further comprising:
learning patterns of at least one normal humidity profile in a learning mode; and
qualifying said generating in further conformity with said stored profile information.

12. A method for detecting potentially destructive water leakage conditions in a building, comprising: detecting a level of humidity inside of said building; sensing motion indicating human activity within said building; generating a preventative response in conformity with a result of said detecting and said sensing such that said preventative response is generated only when said detected level of humidity is greater than a threshold level and the sensing does not sense motion indicating human activity within the building; and sensing activation of at least one appliance that that generates water vapor when in use by measuring an electrical current consumed by said at least one appliance, and wherein said generating generates said preventative response only while said sensing does not sense that said at least one appliance is active.

13. A method of operating a system for detecting potentially destructive water leakage conditions in a building and generating a preventative response, said method comprising:
sensing activation of at least one appliance that can cause an undesirable indication of said water leakage conditions by measuring an electrical current consumed by said at least one appliance; and
blocking generation of said preventative response by said system in response to said undesirable indication responsive to said sensing that said at least one appliance is active.

14. The method of claim 13, further comprising:
detecting said destructive water leakage conditions by determining that water is flowing in a water system of said building; and
disabling at least a portion of said water system by closing an electrically controllable valve as said preventative response if said sensing senses that said at least one appliance is not activated.

15. The method of claim 13, further comprising:
detecting a level of humidity inside of said building;
generating said preventative response in conformity with a result of said detecting when said detected level of humidity is greater than at threshold level, and wherein said sensing senses activation of at least one appliance that generates water vapor.

16. The method of claim 15, further comprising determining when a predetermined time period has elapsed after said sensing senses that said at least one appliance has been deactivated, and wherein said blocking is ceased in response to said determining that said predetermined time period has elapsed.

* * * * *